Aug. 3, 1965   W. C. N. HOPKINS   3,198,552
BUMPER HITCH FOR TOW ATTACHMENTS
Filed Sept. 6, 1963   3 Sheets-Sheet 1

INVENTOR.
WILLIAM C.N. HOPKINS
BY
ATTORNEY

Aug. 3, 1965    W. C. N. HOPKINS    3,198,552
BUMPER HITCH FOR TOW ATTACHMENTS
Filed Sept. 6, 1963    3 Sheets-Sheet 2

INVENTOR.
WILLIAM C. N. HOPKINS
ATTORNEY

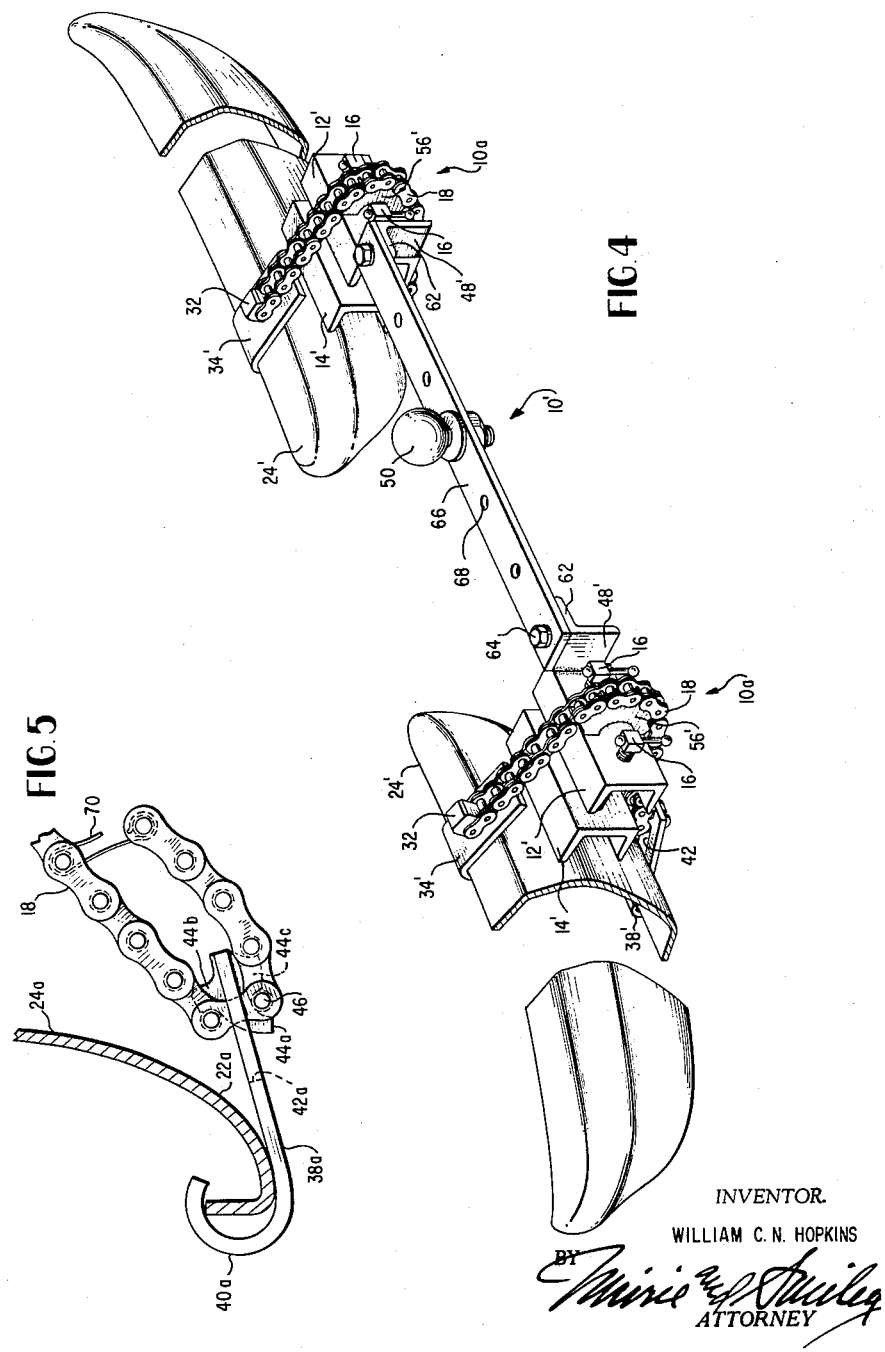

United States Patent Office 3,198,552
Patented Aug. 3, 1965

3,198,552
BUMPER HITCH FOR TOW ATTACHMENTS
William C. N. Hopkins, 1263 Rudgear Road,
Walnut Creek, Calif.
Filed Sept. 6, 1963, Ser. No. 307,081
8 Claims. (Cl. 280—502)

This invention relates to tow bar arrangements in general and, in particular, relates to a bumper hitch assembly having adaptability to various types of bumpers and which readily may be mounted and removed.

Due to the variation in configuration of vehicle bumpers, it has been the practice to provide bumper hitch assemblies that are particularly adapted for certain types of bumpers only. Moreover, in order to obtain the necessary rigidity, the prior assemblies must be mounted more or less permanently because they are not capable of quick attachment to or removal from a bumper.

Having in mind the defects of the prior art devices, it is the primary object of this invention to provide a bumper hitch assembly capable of rapid mounting and removal and which is rugged, reliable and safe in operation, particularly as regards the rigidity with which it is mounted to the bumper of the towed or towing vehicle.

It is another object of this invention to provide a bumper hitch assembly having three cooperative engagement points with a vehicle bumper to effect a maximum of rigidity while yet being capable of rapid application to and removal from the vehicle bumper.

More specifically, it is an object of this invention to provide an improved bumper hitch assembly having a hitch mounting portion including a movable pressure bearing device to seat upon and forcibly bear against a bumper, and with there being a flexible tension means engageable with the upper and lower edges of a bumper and passing over the hitch assembly portion to be tensioned thereby in response to operation of the pressure bearing device; the flexible tension means being frictionally locked to or engaged with the hitch mounting portion to form back-to-back or opposing triangular link systems affording a maximum of rigidity to the device when mounted.

Still another object of this invention is to provide a hitch assembly as aforesaid wherein the pressure bearing device is characterized by having a foot bearing against the bumper at points spaced from each other between the upper and lower edges of the bumper to provide not only a self-centering engagement action with the bumper but to also provide a wide and solid base for the aforesaid back-to-back triangular link systems.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 4 is a perspective view illustrating a modified form of the invention, and

FIG. 5 is an enlarged fragmentary view in side elevation of a modified bumper engaging hook.

Figure 1:
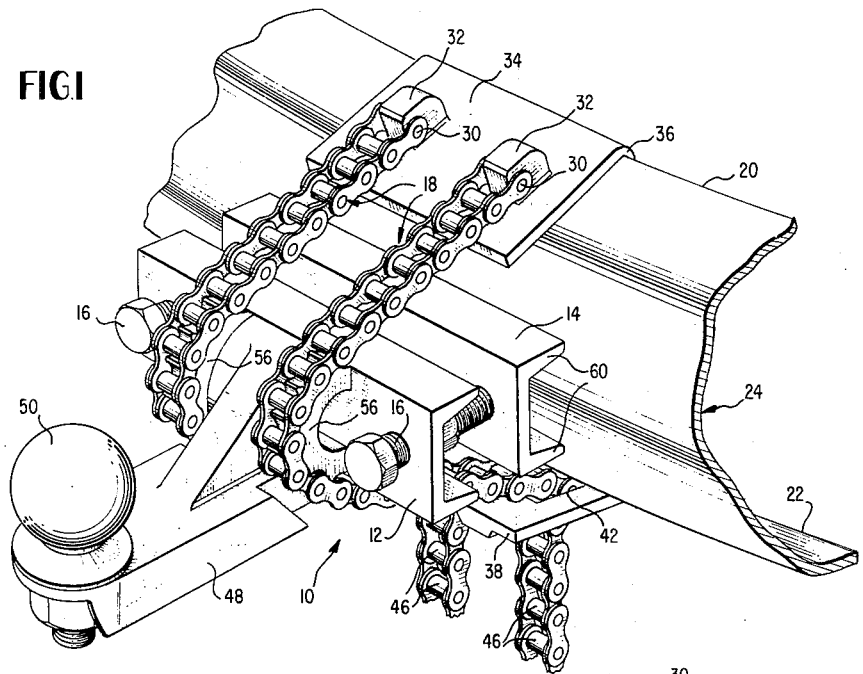
FIG. 1 is a perspective view of a bumper hitch assembly according to this invention as applied to a conventional vehicle bumper, a portion only of the latter being shown.
Figure 2:
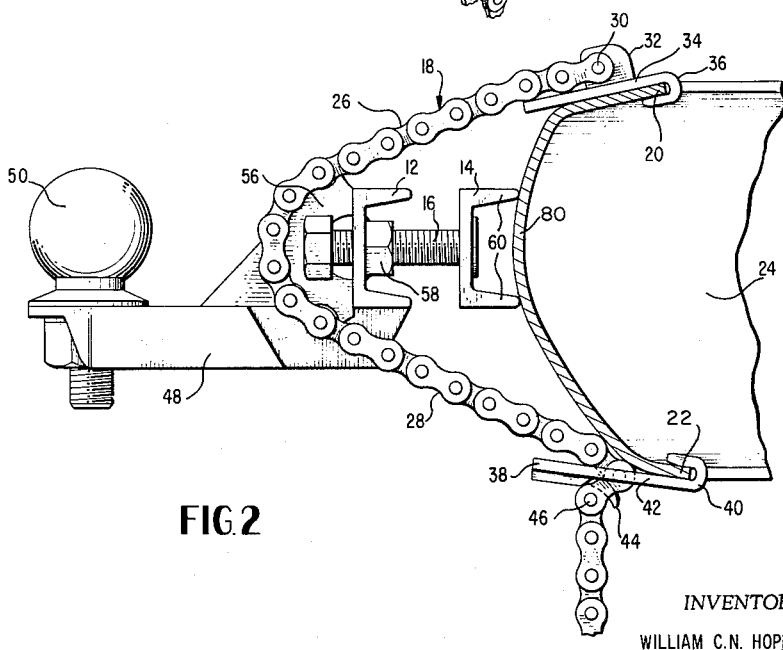
FIG. 2 is a vertical section through a bumper showing the hitch assembly of FIG. 1 in side elevation, the bumper having a slightly different cross section from that shown in FIG. 1.
Figure 3:
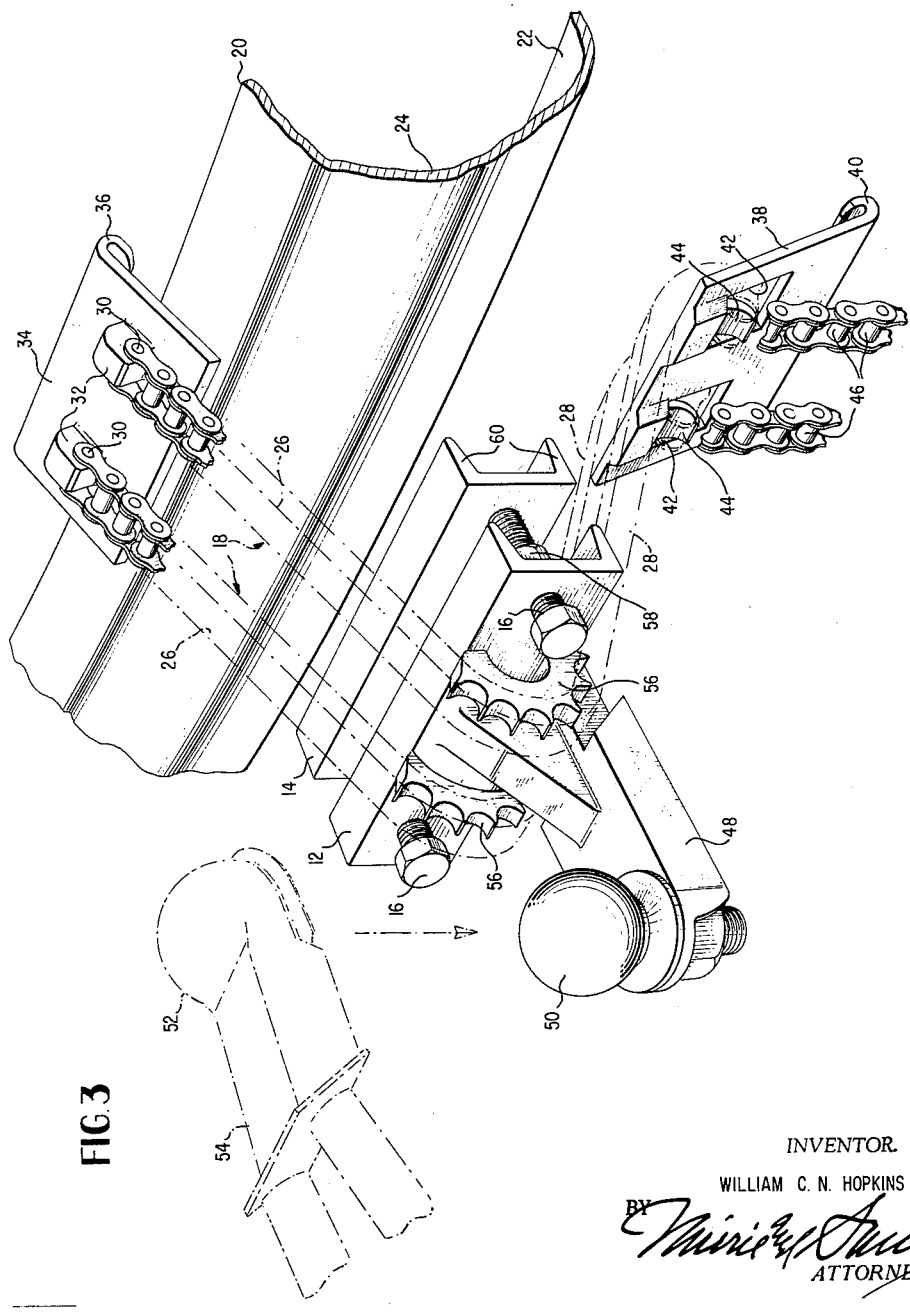
FIG. 3 is an exploded perspective view corresponding to FIG. 1, but showing the chain elements partially broken away and in phantom to illustrate details not evident in either FIG. 1 or FIG. 2.

With reference at this time more particularly to FIGS. 1–3, the hitch assembly 10 comprises three essential parts, namely, a hitch mounting portion including a mounting bar or hitch carrying bar 12, an associated bumper engaging seating member or pressure bearing means 14 connected with the bar 12 by adjustable spacing means which may comprise a pair of spaced bolts 16, and restraining means in the form of a pair of flexible elements 18 adapted to be anchored to the upper and lower edges 20 and 22 of the vehicle bumper 24. By mounting the bar 12 on the member 14 so that these entities may be forced apart, the elements 18 will be placed under tension to form, in effect, two tensioned legs 26 and 28 for each flexible element 18 which are the counterparts of two back-to-back or opposing triangular link systems; there being a common leg for each of said systems formed by the mounting bar 12 as connected to and cooperating with the seating member 14.

More specifically, it is preferred that the flexible elements 18 be in the form of roller chain lengths as shown with one end of each chain being secured as by a pin 30 to a suitable ear 32 fixed to or otherwise rigid with a hook member 34 for attachment to the upper edge 20 of the bumper 24. The hook member 34 is of platelike form provided with a hook edge portion 36 which may snugly engage over the upper edge 20 of the vehicle bumper 24. The ears 32 are spaced on the plate 34 with the pins aligned on an axis perpendicular to the direction of pull on the chains 18 so that the chain links will be uniformly located.

The opposite end of each chain is detachably secured to a lower hook member 38 which, like the upper hoook member 36, is of platelike form having a hooked edge 40 engaging over the lower edge 22 of the vehicle bumper. In order to adapt the device to various sizes and shapes of bumpers, the chains are, as stated, detachably secured to the lower hook member 38. For this purpose, the hook member 38 is provided with a pair of openings 42 each having an arcuately depending tang 44 at the rear edge thereof and which is adapted to be received between adjacent link pins 46 of one of the chains 18 to permit of adjustment to accommodate for the particular bumper encountered.

The bar 12 carires a rigid trailing arm 48 upon which a conventional hitch base 50 is mounted and, as shown in FIG. 3, this base may cooperate in the usual manner with the socket portion 52 of a tow bar assembly 54. The bar 12 also mounts a pair of sprocket segments 56 which are spaced apart on opposite sides of the arm 48, and correspond to the spacing between the chains 18 to provide toothed anchoring means whereby the chains are frictionally locked to or engaged with the mounting bar when tensioned. This effectively isolates the two legs 26 and 28 (FIG. 2) of each chain so that the aforesaid triangular link systems are in fact separate and distinct from a mechanical standpoint although they cooperate with each other to lend a surprising degree of rigidity to the mount by virtue of their sharing certain common link components.

The screw thread members or bolts 16 are rotatably fixed at their inner ends to the pressure bearing means 14, and are engaged in threaded portions of the bar 12, such as nuts 58 which are welded or otherwise fixed to the bar 12. The bolts 16 operate in conjunction with the bar 12 and seating member 14 to form a common leg for the two triangular link systems mentioned. The portions of the bumper 24, on the other hand, above and below the seating member 14 form the third links of the respective systems. In this fashion, the bolts 16 may be operated to forcibly engage the seating member 14 against the bumper 24 between the upper and lower edges thereof and place the flexible restraining members 18 under tension.

To further rigidify the assemblage, the pressure bearing member 14 is of C-shape in cross section and, for this purpose, may be conveniently formed from a length of channel so that the legs 60 thereof bear against the bumper 24 at points which are spaced apart between the upper and lower edge sof the bumper 24. Aside from the fact that the legs 60 provide a wide, sturdy base for the central leg of the two triangular link systems, they also serve to provide a pressure foot which will automatically center itself and in such fashion as to avoid any vertical shifting thereof on the bumper once the seating member is firmly engaged against the bumper so as to tension the chains. In this respect, as will be seen in FIG. 2, a vehicle bumper is normally convex so that the legs 60 of pressure bearing means 14 will normally straddle a slight hammock 80 so that the self-centering and nonslipping actions may naturally occur.

FIG. 4 illustrates a modified form of hitch assembly 10' particularly adapted for that type of vehicle wherein the center section of the bumper 24' may be interrupted or faired into the body such that the upper and lower bumper edges are not accessible in this section. In this case, the assembly 10' comprises two modified mounting units 10a, each somewhat similar to the previously described unit 10, which are spaced apart and jointly support therebetween a ball or equivalent hitch means 50.

Each of the mounting units 10a comprises a pressure element 14' supporting a bar 12' by means of a pair of spaced bolts 16 between which a single sprocket segment 56' is mounted on the bar 12' for cooperation with a single chain 18, the upper end of which is attached by an ear 32 to an upper hook plate 34', a lower hook plate 38' having a single opening 42 cooperating with the single chain 18.

Each of the bars 12' has a rigid trailing portion 48' at the respective inner end thereof and each such trailing portion 48' has a horiozntally disposed bracket 62 extending inwardly toward the other mounting unit 10a and preferably at the upper edge of the trailing portion. Each bracket 62 is adapted to receive a bolt or other attachment means 64 for securing thereon one end portion of a hitch bar 66 extending between said units 10a and supporting the hitch element 50. The hitch bar 66 may be provided with a plurality of spaced openings 68 for laterally positioning of the hitch element 50 or enabling adjustment of the spacing between the mounting units 10a.

A modified form of lower hook member 38a is shown in FIG. 5 as having a hook portion 40a of enlarged radius for cooperation with modified shapes of the lower edge portions 22a of a bumper 24a. In addition to the chain engaging tang 44a depending from the plate 38a at the rear of the opening 42a, there are two sprocketlike teeth 44b and 44c, respectively extending above and below the plate and spaced relative to the tang 44a to engage three successive link pins 46. Both the tang 44a and the teeth 44b and 44c preferably are slightly curved both to more securely engage the link pins 46 and also to facilitate sliding of the pins thereover when initially snugging up the chains 18. This type of hook arrangement has triple holding power.

To mount either of the foregoing hitches, it is merely necessary to hook the top plate 34 or 34' over the top edge 20 of the bumper 24 or 24' and place the hitch body against the bumper with the legs 60 of the seating member 14 straddling that part of the bumper that protrudes outermost. Previously, the bolts 16 are rotated to thread the mounting bar 12 against the seating member 14. The chains 18 are then trained over the sprocket segments 56 or 56' while the trailing arm 48 or 48' is held level so that the hitch element 50 is upright. The chains 18 will engage the sprocket teeth 56 to retain the body element in position while the operator places the lower hook element 38 or 38' over the lower edge 22 of the bumper, and then pulls the chains through the holes 42 within the lower hook member, pulling rearwardly on the ends of the chains to take up all possible slack between the sprocket segments 56 and the lower hook member and to engage the chain links over the respective teeth or tangs 44.

The bolts 16 are then rotated to force the mounting bar 12 from the seating member 14 until the upper and lower legs 26 and 28 of the chains are taut and the hitch is rigid with the bumper. Obviously, the rotation of the bolts 16 must be uniform so as to move the mounting bar 12 uniformly at both ends and hold parallel with the seating member 14. If desired, the free ends of the chains may be provided with clips or hooks 70 (FIG. 5) which may be fastened to the lower rigid leg 28 of the respective chains to prevent dangling of the loose ends. The foregoing operation can be readily performed by the average operator in less than two minutes so that the hitch can readily be attached and detached from the bumper.

Although certain specific embodiments of the invention have been shown and described, it is obvious that many modifications thereof are possible. The invention, therefore, is not to be restricted except insofar as is necessitated by the prior art and by the spirit of the appended claims.

That which is claimed is:

1. A hitch assembly adapted to be removably attached to a vehicle bumper, comprising, upper and lower hook members adapted to engage with and anchor to the upper and lower edges of an associated bumper, a pair fo chains connecting said upper and lower hook members, a hitch mounting bar having pair of toothed elements rigid therewith and disposed in spaced relation on said mounting bar with the spacing between toothed elements being such that said chains pass over and mesh with respective ones of said toothed elements at points on the chains between said hook members, a pressure foot spaced inwardly of said mounting bar and adapted to bear against an associated bumper between the upper and lower edges thereof, and means for positioning said mounting bar forcibly away from said pressure foot to tighten said chains and make said mounting bar rigid with the associated bumper and including mechanism interconnecting said pressure foot and said mounting bar for selectively increasing the spacing therebetween.

2. The assembly as defined in claim 1 wherein said pressure foot is in the form of a C-sectioned member for engaging a bumper at vertically spaced points thereof.

3. A hitch assembly adatped to be removably attached to a vehicle bumper, comprising, a hitch mount assembly including a hitch-carrying bar, seating means adapted to bear against an associated bumper and mechanism connecting said bar and said seating means to selectively urge the same apart, and restraining mens adapted to be anchored to the upper and lower edges of an associated bumper and limit the distance by which said hitch-carrying bar may be spaced from an associated bumper, said restraining means comprising flexible elements passing over and locked to said hitch-carrying bar when said mechanism is operated to urge said bar and said seating means apart, said flexible elements comprising lengths of roller chain, a sprocket segment fixed to said hitch-carrying bar for each of said chains and over which respective chains pass to lock the chains to the bar.

4. The assembly as defined in claim 3 wherein said restraining means comprises at least one hook plate for engaging over one edge of a bumper and having at least one opening for passage of one of said chains, and three teeth on said plate adjacent said opening for engaging three successive chain links above and below said plate.

5. The assembly as defined in claim 3 wherein said seating means is of C-shape cross section presenting spaced feet engageable with a bumper at points thereof spaced apart between the upper and lower bumper edges.

6. A hitch assembly adapted to be removably attached to a vehicle bumper, comprising, a hitch mount assembly including a hitch-carrying bar, seating means adapted to bear against an associated bumper and mechanism connecting said bar and said seating means to selectively urge the same apart, and restraining means adapted to be anchored to the upper and lower edges of an associated bumper and limit the distance by which said hitch-carrying bar may be spaced from an associated bumper, said restraining means comprising flexible elements passing over and locked to said hitch-carrying bar when said mechanism is operated to urge said bar and said seating means apart, said hitch-carrying bar being divided into three sections, a center section carrying a hitch element and a pair of end sections to which said center section is detachably secured, said flexible elements being in the form of a pair of roller chains, one for each end section and each end section having a sprocket segment fixed thereto over which a respective chain passes to lock the chains to said end sections, said seating means comprising a channel member spaced inwardly from each end section, and said mechanism comprising a pair of screw thread members engaged with each end section on opposite sides of the associated sprocket segment and rotatably attached to an associated channel member at their inner ends.

7. The assembly as defined in claim 6 wherein the center section is detachably secured to said end sections by having its respective end portions removably mounted on said end sections, said center section comprising a horizontally disposed bar having a series of holes spaced longitudinally thereof for the selective attachment of said hitch element thereto and of its end portions to said end sections.

8. A hitch assembly comprising, in combination, a pair of hook plates adapted to engage the upper and lower edges of a vehicle bumper, a pair of roller chains disposed in spaced relation with each chain having one end thereof anchored to one of said plates and its opposite end adjustably secured to the other plate, a mounting bar having a fixed, trailing arm carrying a hitch base, a pair of sprocket segments fixed to the trailing side of said mounting bar and disposed in spaced relation to each other on opposite sides of said trailing arm, said chains being engaged with respective ones of said sprocket segments to fix the spacing between said bar and an associated bumper, a channel-shaped pressure member presenting a pair of legs adapted to bear against a bumper at vertically spaced regions thereof between the upper and lower edges, and a pair of screw thread members engaged with said mounting bar outboard respective ones of said sprocket segments and engaging said pressure member to space said mounting bar away from said pressure members to tension said chains.

References Cited by the Examiner
UNITED STATES PATENTS

| | | | |
|---|---|---|---|
| 1,408,900 | 3/22 | Miller et al. | 248—231 |
| 2,468,438 | 4/49 | Galen | 280—502 |
| 2,569,843 | 10/51 | Adler et al. | 280—502 |
| 2,791,445 | 3/57 | Wanamaker | 280—502 |

BENJAMIN HERSH, *Primary Examiner.*

A. HARRY LEVY, *Examiner.*